United States Patent [19]

Capps

[11] Patent Number: 4,643,023

[45] Date of Patent: Feb. 17, 1987

[54] VIBRATION TESTING APPARATUS

[76] Inventor: David F. Capps, 18171 Criswood, Mt. Clemens, Mich. 48044

[21] Appl. No.: 793,956

[22] Filed: Nov. 1, 1985

[51] Int. Cl.$^4$ ............................................. G01M 15/00
[52] U.S. Cl. ..................................... 73/117.3; 73/660
[58] Field of Search ...................... 73/117.3, 116, 660; 364/551, 508

[56] References Cited

U.S. PATENT DOCUMENTS

| | | | |
|---|---|---|---|
| Re. 29,810 | 10/1978 | Marino | 73/117.3 |
| 3,376,733 | 4/1968 | Trimble et al. | 73/71.4 |
| 4,335,600 | 6/1982 | Wu et al. | 73/117.3 |
| 4,453,407 | 6/1984 | Sato et al. | 73/462 |
| 4,478,082 | 10/1984 | Sato et al. | 73/593 |
| 4,485,678 | 12/1984 | Fanuele | 73/660 |
| 4,488,240 | 12/1984 | Kapadia et al. | 364/508 |
| 4,586,369 | 5/1986 | Vogler | 73/117.3 |

Primary Examiner—Jerry W. Myracle
Attorney, Agent, or Firm—Basile, Weintraub & Hanlon

[57] ABSTRACT

A vibration testing apparatus for detecting vibrations in a rotating internal combustion engine. The apparatus includes a sensor mounted on the engine and a timing circuit responsive to the firing of the spark plugs in the engine to generate successive time windows corresponding to the firing of each spark plug during which the frequency of vibrations are sensed by the sensor. The sensed frequencies and intensities of the vibrations are measured against pre-settable intensities for each cylinder of the engine which are settable with respect to the location of each cylinder to the sensor and, also, the firing order of each spark plug in the engine. This generates an output indicative of any excess vibrations within the engine and provides an indication of which cylinder in the engine such excess vibrations are being generated.

7 Claims, 6 Drawing Figures

VIBRATION TESTING APPARATUS

BACKGROUND OF THE INVENTION

FIELD OF THE INVENTION

The present invention relates, in general, to vibration testing apparatus and, more specifically, to apparatus and methods for detecting excessive vibrations in rotating internal combustion engines, such as those commonly used in vehicles automobiles and trucks.

A sensor is typically mounted on each engines for detecting vibrations caused by the interference or clearance between the various rotating and reciprocating parts of the engines. The output from the sensor is analyzed to determine whether the vibrations are indicative of a good or faulty enging. However, the sensor output and analyzed data merely provides an average value for the total vibrations caused by all of the rotating and reciprocating components of the engine during a predetermined time period such as one firing cycle or rotation of the engine. Such previously devised testing apparatus do not identify the location in the engine where the vibration is occurring.

In rotating internal combustion engines, vibrations are typically caused by misalignment or excessive clearance between rotating and reciprocating components. Such vibrations are intensified during the detonation of the spark plug in each cylinder of the engine. It is known that certain problems, such as rod knock or piston slap, produce vibrations at different frequencies. However, previously devised testing apparatus merely average such frequencies over the entire engine firing cycle and do not provide any differentiation between the individual cylinders of the engine. Thus, the engine as a whole is accepted or rejected and, if rejected, there is no indication provided to the location of the source of the excessively high vibrations.

Thus, it would be desirable to provide a vibration testing apparatus which overcomes the problems encountered with previously devised vibration testing apparatus insofar as providing an indication of the source of the excessive vibrations in the engine. It would also be desirable to provide an engine vibration testing apparatus suitable for use with internal combustion engines which provides an indication of which cylinder in the engine any excessive vibrations are being generated. It would also be desirable to provide a vibration testing apparatus which could be used on engines of varying cylinder numbers. It would also be desirable to provide such a vibration testing apparatus which is usable for different locations of the vibration sensor on the engine. Finally, it would be desirable to provide a vibration testing apparatus which adjusts the pre-set reference vibration levels for varying engine speeds.

SUMMARY OF THE INVENTION

The present invention is the vibration testing apparatus for detecting excessive vibrations in rotating internal combustion engines.

The vibration testing apparatus includes a sensing means, such as an accelerometer, which is mounted on the engine and provides an output signal responsive to the intensity of the vibrations generated in engine. Timing means, responsive to the firing of the spark plug in each cylinder of the engine generates "time windows" during which the frequency and intensity of the vibrations generated in the engine is sensed by the accelerometer and compared with pre-set reference intensity levels for each cylinder.

Preferably, two frequencies corresponding to a vibration producing event, such as rod knock or piston slap, which commonly occur within the cylinders of each engine and for which excessive vibration frequencies and intensities are known, are pre-set for the engine.

A plurality of switches, responsive to a signal from the engine indicating which cylinder is currently firing, provide a sequential order indicative of the firing order of each spark plug within the engine regardless of the firing order or number of cylinders of the engine.

The intensity of vibrations detected during each "time window" is compared against pre-set intensity levels for each cylinder which can be adjusted depending upon the location of each cylinder from the sensor. An engine timing and speed coordination circuit is also provided for varying the pre-set frequency levels depending upon the speed of the engine to thereby accommodate higher vibration levels normally generated at higher engine speeds.

The vibration testing apparatus of the present invention overcomes many of the deficiencies encountered with previously devised engine vibration testers insofar as providing an exact indication of which cylinder of a rotating internal combustion engine have interference or clearance problems. This enables the engine to be more quickly and inexpensively repaired for manufacturing defects rather than having the whole engine torn down for inspection to locate the location of the misfit or excessive clearance problem. The vibration testing apparatus of the present invention is also suitable for use on different sized engines having differing numbers of cylinders, as well as engines having different firing sequences.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, the same reference number is used to refer to the same component shown in multiple figures of the drawing.

The present invention is an engine vibration tester which detects and locates vibration levels above pre-set limits in the various cylinders of a reciprocating, internal combustion engine. Before describing the circuitry employed in the vibration tester, a brief description of the theory of operation of the vibration tester of the present invention will be provided.

I. Theory of Operation

When operating, various vibrations will be generated in a reciprocating internal combustion engine by the interaction of the various moving parts of the engine, such as the piston rods, crankshaft, etc., as well as the detonation of fuel in each cylinder of the engine. It has been found that each moving part of the engine generates vibrations in its interaction with surrounding parts at a particular frequency. Such frequencies can be detected to provide an indication of the fit of a particular part of the engine, such as the piston rod, crankshaft, etc., with respect to its surrounding components and yield an indication of an acceptable or defective engine.

It has been found that four factors are interrelated in the examination of vibrations from a rotary internal combustion engine. Such factors include the frequency of the vibrations, resonance, the intensity of the vibrations and the time during which the vibrations are generated during the firing cycle of each cylinder of the engine. The engine itself will resonate or "ring" at certain characteristic frequencies generated within the engine during its operation. Certain resonant nodes or points of a minimum vibration in the engine will vibrate with more or less intensity depending upon the proximity to the nodes to the source of the vibrations. The location of the vibration nodes are dependent upon the location of the source of the vibration itself as well as the frequency of the vibration.

The intensity of the vibrations also varies and is primarily dependent upon the intensity of the source of the vibration which could be caused by a large gap or clearance between two interactive parts of the engine. The intensity of the vibration is also dependent upon the location of a sensor which detects the vibration in relationship to the resonant nodes.

Finally, the detonation of fuel caused by the spark plug in each cylinder of the engine as well as higher revolutions or R.P.M.'s of engine speed, increases the intensity of the vibrations.

All of these factors must be considered when it is desired to detect and isolate vibrations from various parts of a rotating internal combustion engine so as to make a determination as to whether or not the engine is properly constructed.

As such, the present vibration test apparatus is constructed to perform the following steps:

1. Sensing the vibrations on the engine.
2. Isolating the characteristic frequencies which are known for various components of the engine.
3. Creating a time frame or "window" derived from the timing of the engine which is related to which particular cylinder is being detonated, and
4. Comparing the intensity level of the isolated frequency or frequencies to a reference level which is adjustable for each cylinder to compensate for variations in intensity levels due to the resonant qualities of the engine block and the location of the sensor with respect to each cylinder.

In this manner, an indication can be obtained for the vibrations within each cylinder of the engine to provide an indication that the engine is properly constructed.

II. Functional Operation

The present invention by example only has been constructed for use in detecting and indicating the vibrations in a reciprocating internal combustion engine having a computer controlled ignition system. It will be understood, however, that other engines may also be utilized with the present vibration tester with minor modifications consistent with the function of the present vibration testing apparatus.

Figure 1:
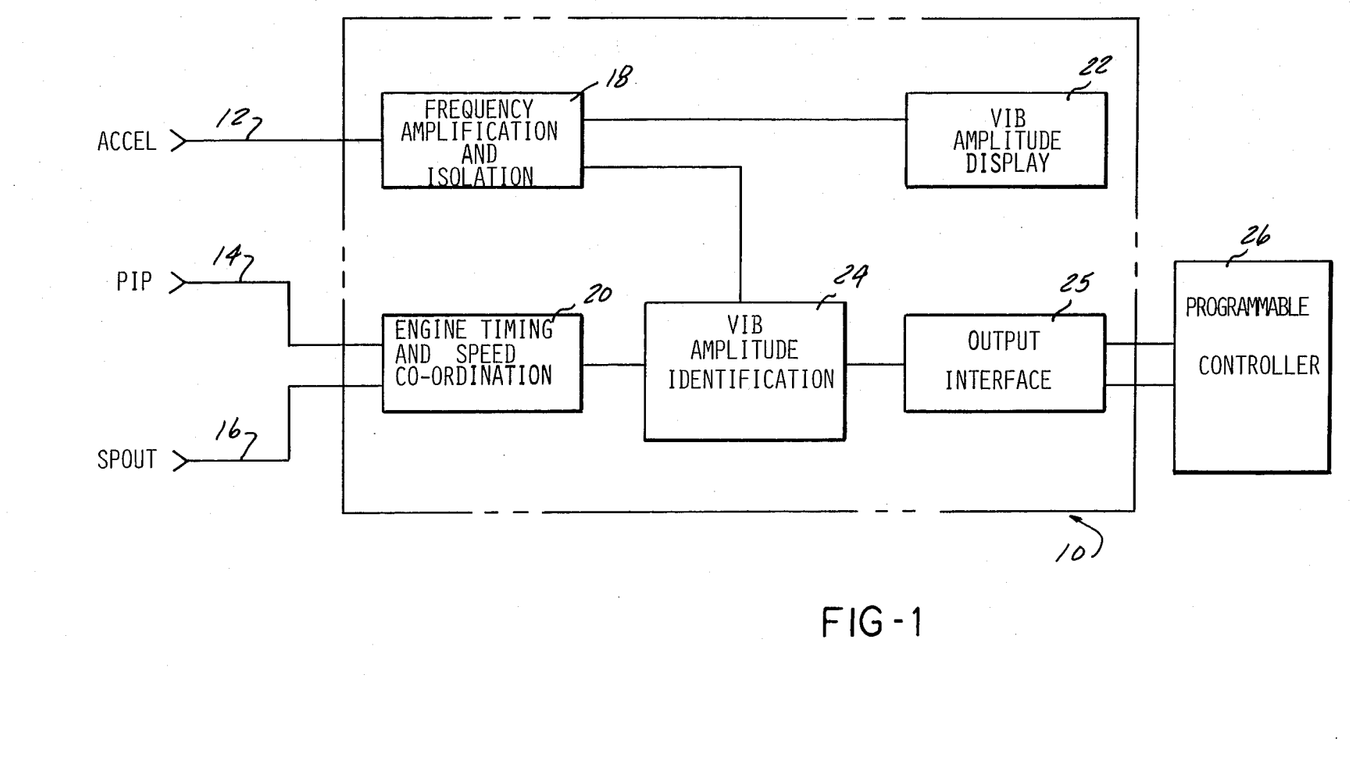
FIG. 1 is a block diagram of the vibration testing apparatus of the present invention.

Referring now to the drawing and in particular to FIG. 1, there is illustrated a block diagram of a vibration testing apparatus 10 which detects and provides an indication of vibrations within each cylinder of a rotary internal combustion engine. The apparatus 10 receives an input from an accelerometer, 12 which is mounted on the engine at any location, preferably, not at a vibration node point. In a preferred embodiment, the accelerometer 12 is mounted in proximity with the flywheel of the engine; although other positions may also be employed dependent upon which vibration component is desired to be detected. An accelerometer manufactured by Bruel & Kjaer, Model Number 4367, is utilized for exemplary purposes. It will be understood that other devices which translate physical vibrations into electrical signals may also be employed.

Other inputs to the vibration testing apparatus 10 include a signal labeled PIP 14 which provides an indication of the firing of the spark plug(s) of a particular cylinder in the engine typically used to identify the number one cylinder in the engine firing sequence. This could be generated by a simple inductive couplet mounted on the spark plug cable for the number one cylinder. Due to current techniques utilized in an electronic ignition control, the PIP signal 14 may also be generated from the computer or electronic module controlling the ignition firing of the engine. Another signal labeled SPOUT 16 is also input to the vibration testing apparatus 10. The SPOUT 16 signal may be generated by any conventional means, such as by an inductive coupler mounted around the coil spark cable, to indicate the firing of single spark plug.

The PIP signal 14 and the SPOUT signal 16 are generated at different time intervals during the firing of the engine so as to provide an identification of the firing of a particular cylinder, such as the number one cylinder in the engine.

The accelerometer 12 is input to a frequency amplification and isolation circuit denoted in general by reference number 18 in FIG. 1. The PIP signal 14 and SPOUT signal 16 are input to an engine timing and speed coordination circuit 20 to detect the firing of one particular cylinder of the engine during its rotation and to correlate this firing or detonation with the engine speed or R.P.M.

The frequency amplification and isolation circuit 18 is adjustable to detect any desired frequency of engine vibration and generates an output to a display 22 for displaying the intensity of the vibrations as well as generating an output to a vibration identification circuit 24. The output from the engine timing and speed coordination circuit 20 is also input to the vibration identification circuit 24 to coordinate and generate a time window during which the vibrations are detected and an indication is made of which cylinder in the engine the vibrations are coming from.

The output from the vibration identification circuit 24 is input to an output interface circuit 25 which detects which cylinder has generated a vibration beyond acceptable levels and provides an output signal to an external indicator device 26, such as a programmable controller which controls the engine test machine or indicator lights on a control panel which indicate that an unacceptable vibration has been detected in a particular cylinder of the engine.

Figure 2:
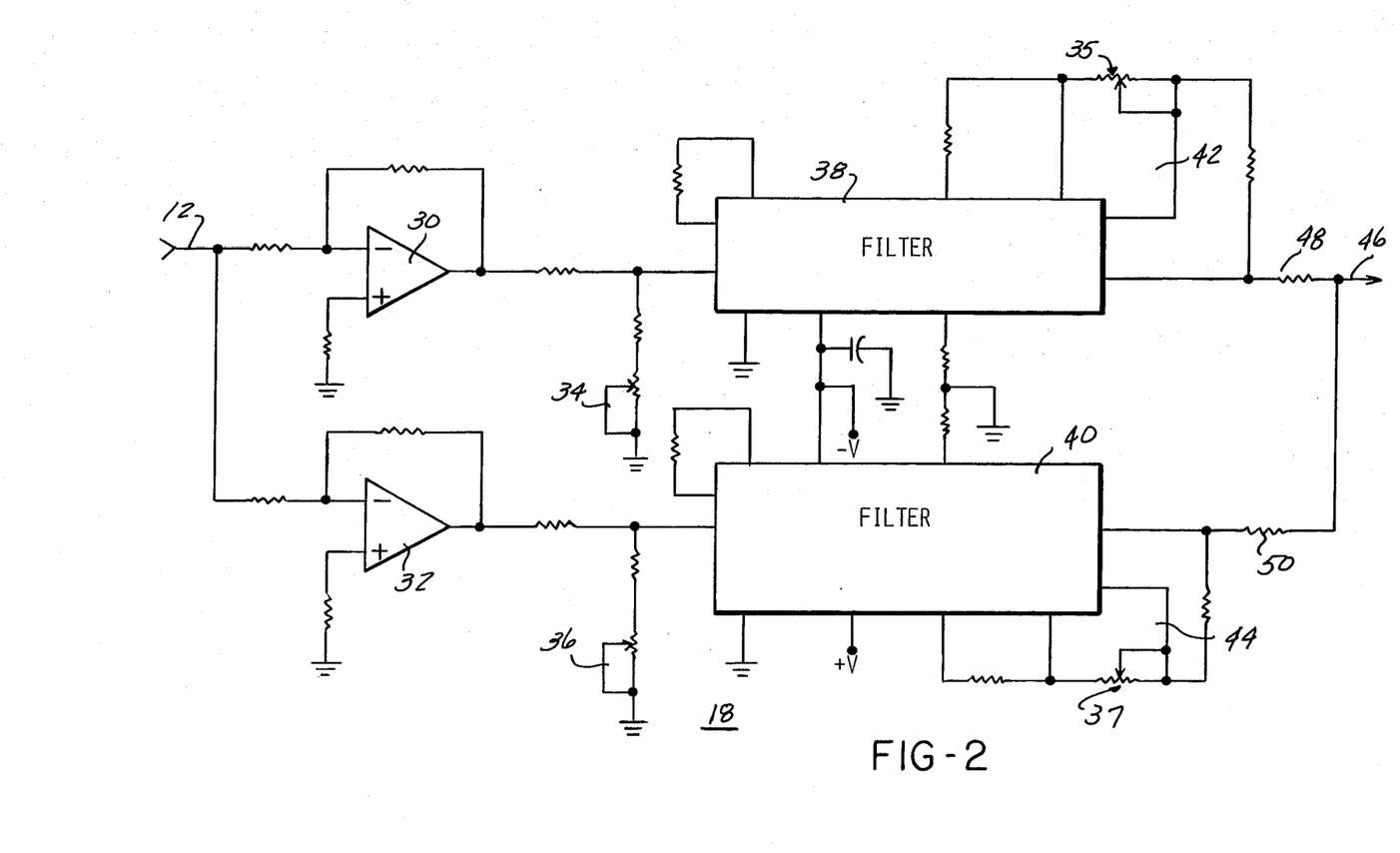
FIG. 2 is a schematic diagram of the frequency amplification and isolation circuit shown in FIG. 1.

Referring now to FIG. 2, there is illustrated a detailed circuit of the frequency amplification and isolation circuit 18 shown in FIG. 1. The isolation circuit 18 receives the output from the accelerometer 12 which is input to two amplifiers 30 and 32. Potentiometers 34 and 36 are connected between the output of the amplifiers 30 and 32, respectively, and filter means 38 and 40 to set the bandwidth of the filters 38 and 40, respectively, in order to detect different frequencies of vibrations from the accelerometer 12. In the preferred embodiment 12, the frequencies can be set between a range of 250 Hz to 10,000 Hz.

It will be understood that additional filters or multi-stage filters may also be provided to detect other frequencies to detect different frequencies from the engine itself.

The outputs from the amplifiers 30 and 32 are input to the band pass filters 38 and 40, respectively, which are provided with suitable circuitry 42 and 44, respectively, which sets the frequency of the vibrations which are to be detected in the engine. In this manner, a center frequency is set for detecting vibrations in the engine as well as an a range of frequencies of either side of the center frequency. This is implemented by means of a summing network comprised of resistors 48 and 50 which are connected in parallel and provide an output signal on line 46.

Figure 3:
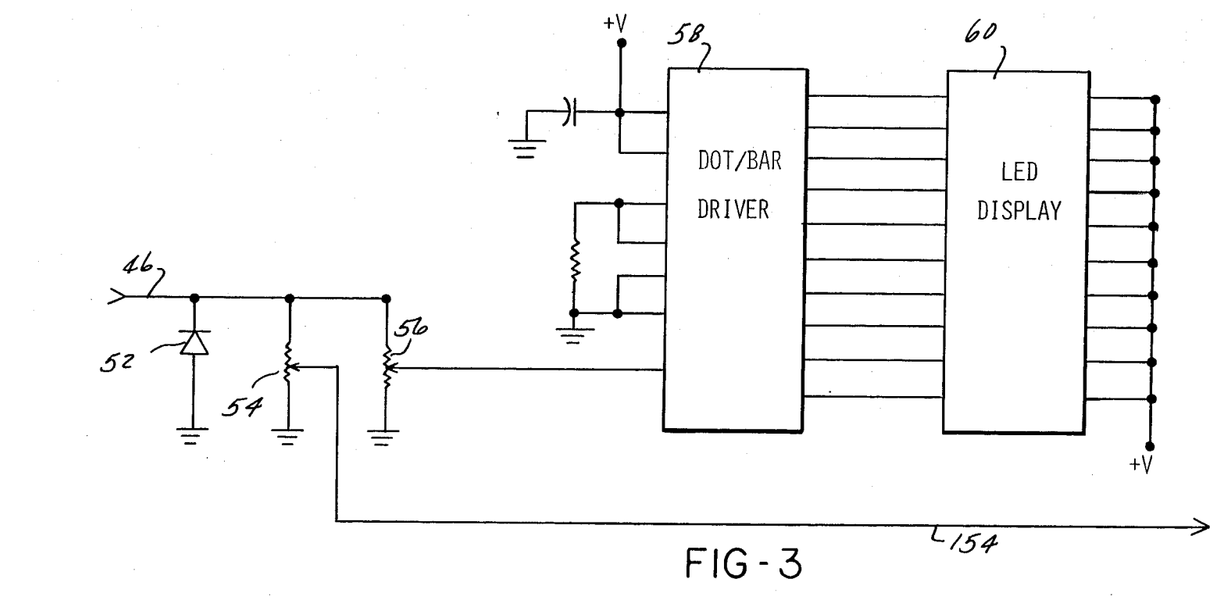
FIG. 3 is a schematic diagram of the vibration amplitude display circuit shown in FIG. 1.

As shown in FIG. 3, the control signal 46 is connected to a clipper circuit 52 formed of a diode which cuts negative going signals and then, through an adjustable potentiometer 54 for gain control for the vibration amplitude identification circuit 24 and, then to a gain control circuit 56 for a display driver 58. This is an input to a display means 60, such as a dot/bar driver which drives a LED display which provides a visual display of the intensity of the vibrations generated within the engine.

Figure 4A:
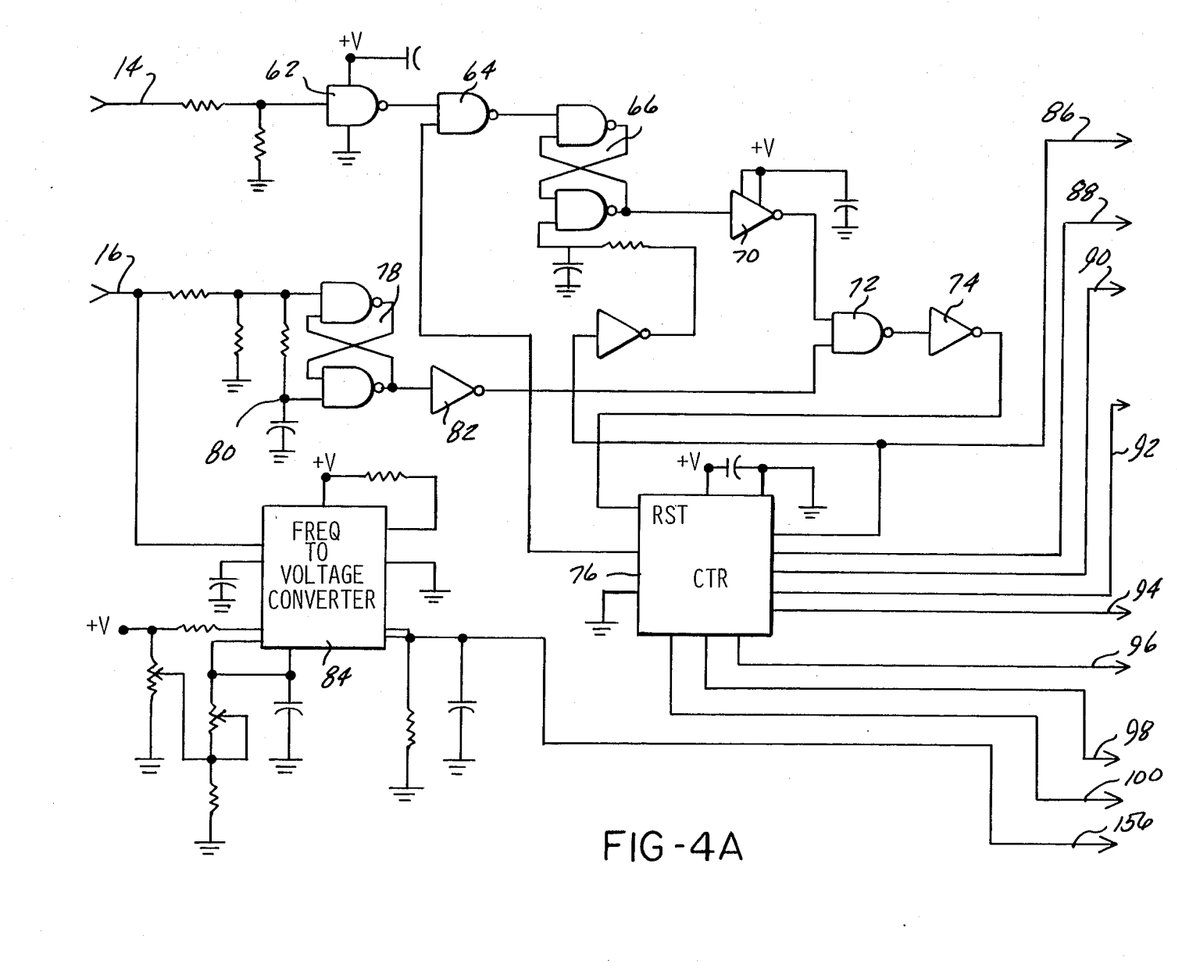
FIGS. 4A and 4B are schematic diagrams of the engine timing and speed coordination circuit and vibration amplitude identification circuit shown in FIG. 1.
Figure 4B:
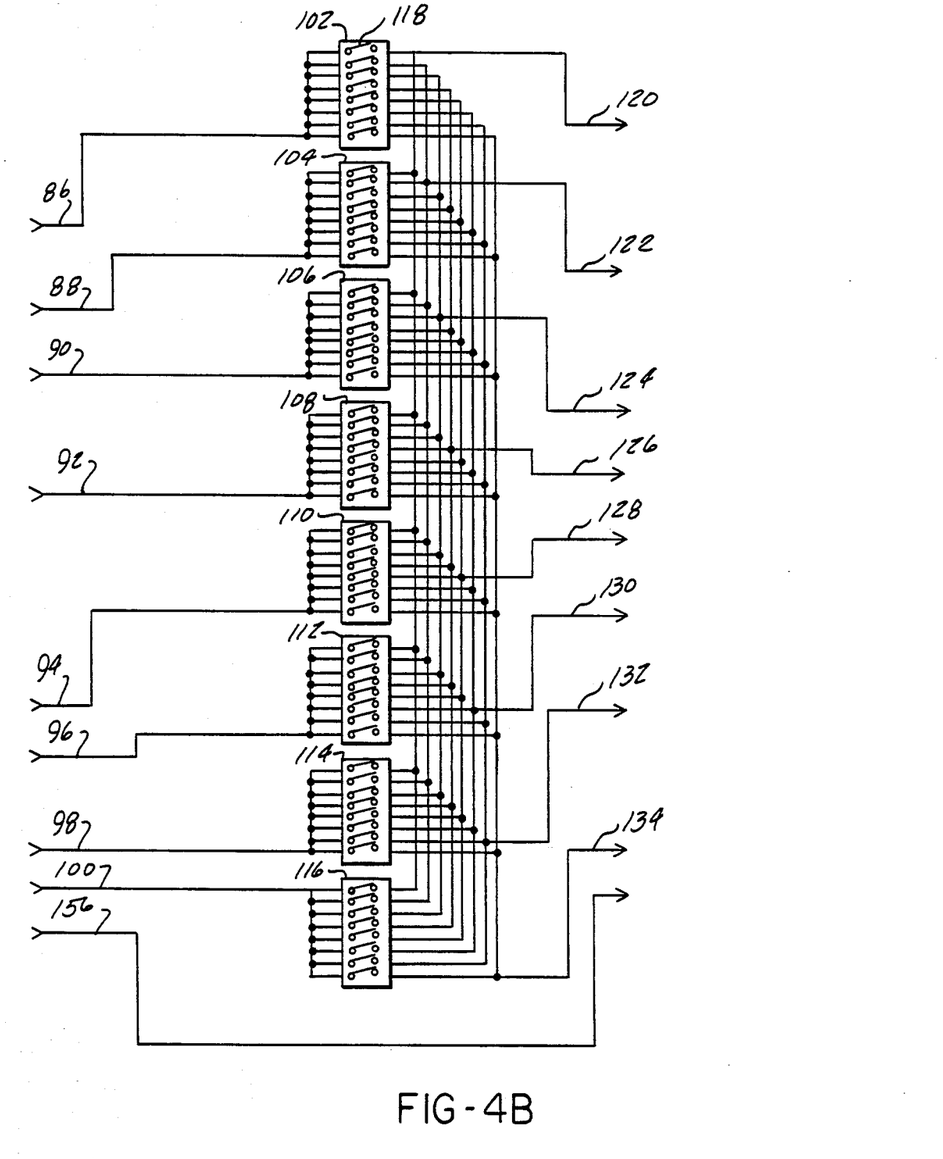

Referring now to FIGS. 4A and 4B, there is illustrated the circuitry which receives the PIP signal 14 and the SPOUT signal 16 from the engine control circuitry. The PIP signal 14 is passed through NAND gates 62 and 64 to provide an indication fo the detonation of a particular cylinder of the engine, such as the number one cylinder labeled number 1. This is locked into a flip-flop 66 and input through inverter 70 to NAND gate 72. The output of the NAND gate 72 is input through an inverter 74 to a counter 76, which is preferably formed as a decade counter.

The output signal from the inverter 74 to the counter 76 causes the counter 76 to be reset so as to begin counting upon the next signal from a SPOUT signal 16 indicating another spark plug ignition within the engine. This places the counter 76 into a cycle corresponding to the number of cylinders within the engine and advances the counter 76 once for each spark plug ignition with the counter 76 being reset when a pre-determined spark plug, such as the first spark plug in the firing order, fires.

The SPOUT input signal 16, which is generated upon each spark plug ignition, is input to a flip-flop 78 which is reset by an R-C circuit 80 and record the firing of the various spark plugs of the engine. The output from the flip-flop 78 is input to the NAND gate 72 through inverter 82 as well as to the counter 76 to advance the counter 76 once for each firing of a spark plug in the engine.

When the firing of a spark plug has been detected and the detection signal transmitted from the inverter 82 to the NAND gate 72, if the other input to the NAND gate 72 indicates to the firing of a pre-determined spark plug in the firing order, such as the first spark plug, of the engine, the NAND gate 72 will generate an output which is transmitted through inverter 74 to the counter 76 to reset the counter 76 for the next firing cycle of the engine.

The SPOUT output signal 16 is also input to a frequency-to-voltage converter 84 which is provided with suitable biasing circuitry. The frequency to voltage converter 84 provides adjustability to the vibration testing apparatus 10 of the present invention in order to compensate for higher intensities which are generated at higher R.P.M. speeds of the engine. This is recognized as a smaller time period between adjacent SPOUT input signals 16 from the engine.

The outputs from the counter 76 are labeled 86, 88, 90, 92, 94, 96, 98 and 100. By way of example, the counter 76 provides eight outputs so as to enable the use of the vibration testing apparatus 10 of the present invention on the different sized engines having four, six or eight cylinders. It will be understood that the counter will be reset, as described above, for engines having a smaller number of cylinder, such as four or six cylinders, upon the generation of each PIP signal 14. The outputs 86, 88, 90, 92, 94, 96, 98 and 100 are each input to a separate switch assembly, such as switch assemblies 102, 104, 106, 108, 110, 114 and 116, respectively, shown in FIG. 4B. Each of the switch assemblies, such as switch assembly 102, is provided with eight dip switches, such as dip switch 118.

Each dip switch 118 in the switch assemblies 102, 104, 106, 108, 110, 112, 114 and 116 provides a routing network with their outputs connected as shown in FIG. 4B to place the order of the firing of the cylinders in a proper sequence regardless of the specific firing order of the engine. This insures that the output 120 from the first switch assembly always corresponds to the firing of the number one cylinder in the engine; while the output 122 of the switch assembly corresponds to the second cylinder, etc.

The output from the first dip switch 118 in each switch assembly 102, 104, 106, 108, 110, 112, 114 and 116 are connected together and output along line 120. Correspondingly, the output from the eighth dip switch in each switch assembly are also connected together and output on line 134. Similar connections are made for the outputs of the corresponding dip switches 118 in the remaining switch assemblies so as to provide separate outputs on lines 122, 124, 126, 128, 130 and 132 to analog switches shown in FIG. 5.

Figure 5:
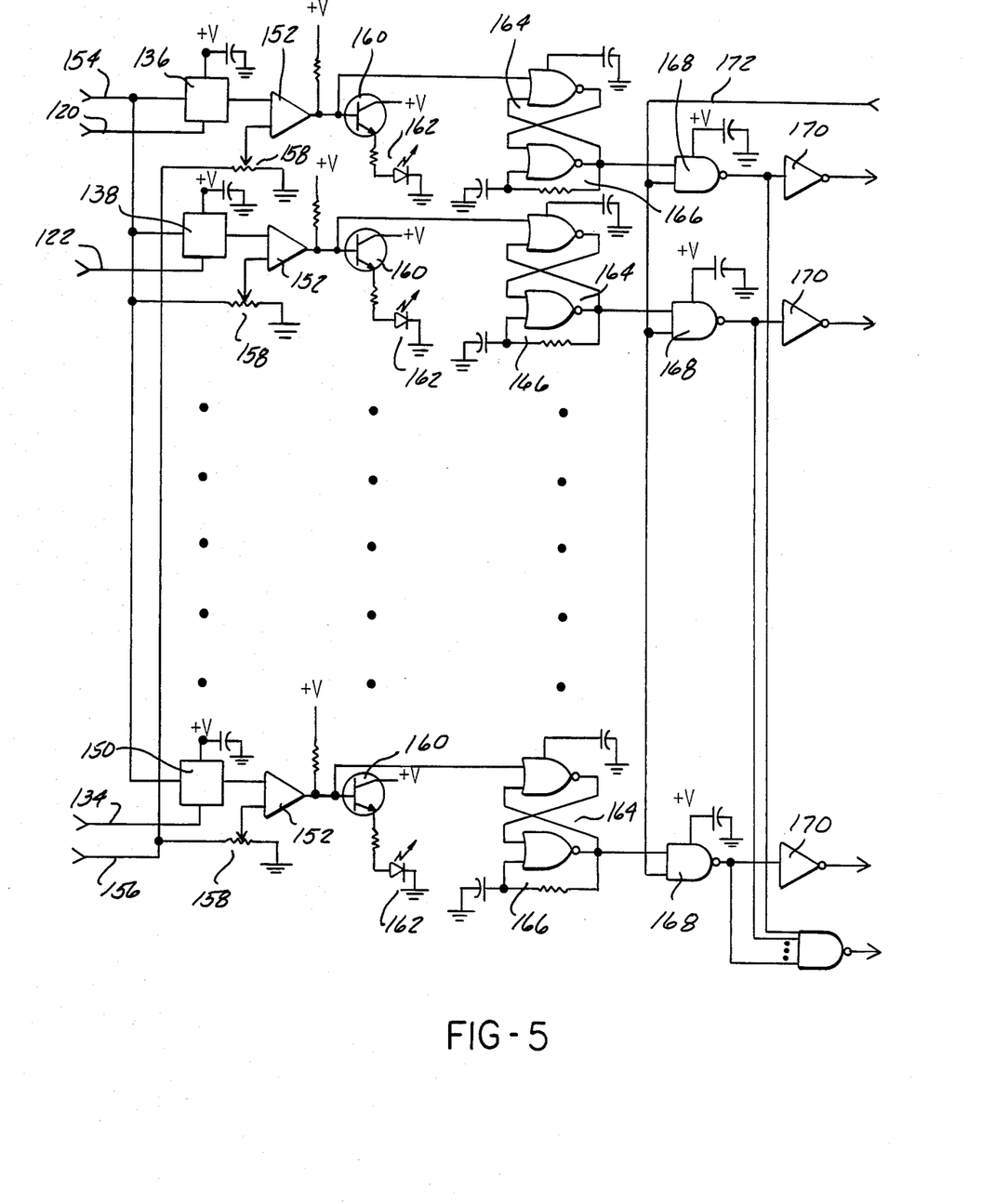
FIG. 5 is a schematic diagram of the output interface circuit shown in FIG. 1.

The separate outputs 120, 122, 124, 128, 130, 132 and 134 from the switch assemblies are respectively connected to one of the analog switches, such as analog switches 136, 138 and 150, respectfully. The analog switches function to convert the digital input signals 120, 122, 124, 126, 1128, 130, 132 and 134 to time windows. Another input to each of the analog switches, such as analog switch 136, is the output 154 on line 46 from the frequency amplification and isolation circuit 18 shown in FIG. 2. This provides an indication of the measured vibration from the engine. Depending upon which analog switch is activated by an output from one of the switch assemblies corresponding to which cylinder in the engine is fired, the appropriate analog switch will be energized and provide an output to a comparitor 152.

Identical circuitry is provided for each output from the switch assemblies, only one circuit will be described in detail hereafter. A second input to the comparitor 152 is the output from a potentiometer 158 which is connected to a control line 156 as an output frm the frequency-to-voltage converter 84 shown in FIG. 4. This provides a variation in the voltage to the potentiometer 158 which corresponds to the variation in the frequency of spark plug firings caused by varying engine speeds.

The comparitor 152 generates an output when the signal on line 154 through analog switch 136 exceeds the level of the potentiometer output 158 which provides an adjustable level for resonance and intensity levels for each particular cylinder of the engine. In order to compensate for the difference in the distance of each cylinder from the accelerometer 12 as well as higher intensity vibrations caused by increased engine speeds the potentiometer 158 is adjusted to equal the level of the output from the associated analog switch when a known "good" engine is tested. The output from the comparitor 152 is input to a driver 160 to drive a signalling device, such as a LED 162. As a separate LED 162 is provided for each cylinder of the engine, a separate indication is available when a particular vibration level exceeding a pre-set reference level is detected in one of the cylinders of the engine.

The output from the comparitor 152 is also input to a pulse shaping circuit comprising a flip-flop 164 and an R-C 166 which lengthens the output pulse from the comparitor 152. The output from the flip-flop 164 is input through a NAND gate 168 and amplifier 170 to generate a signal to an external control device 26, FIG. 1, such as a programmable controller, which controls the overall operation of the engine testing machine or to an signalling device such as an LED, pilot light, etc.

An input signal 172 is also connected as an input to each NAND gate 168 and is generated by the external control apparatus 26, such as the programmable controller, for energizing and enabling an output to be generated by the vibration tester 10 of the present invention only at certain pre-determined times during the engine testing cycle, such as when the engine has reached a pre-determined speed for a pre-set amount of time.

What is claimed is:

1. A vibration testing apparatus for reciprocating internal combustion engines having a plurality of cylinders, each including at least one detonatable spark plug, comprising:
   means, mounted on the engine, for detecting the frequency of vibrations in the engine;
   means for generating a signal corresponding to the detonation of the spark plug in each cylinder of the engine; and
   means, responsive to the signal generating means and the detecting means, for comparing the detected vibrations in a timed sequence from each cylinder in the engine with pre-set frequencies for each cylinder and generating an output signal for each cylinder indicative of an excessive vibration frequency in any cylinder of the engine.

2. The vibration testing apparatus of claim 1 further including display means for indicating which cylinder in the engine is producing excessive vibrations.

3. The vibration testing apparatus of claim 1 further including:
   means, connected to the engine, for indicating the firing of one of the spark plugs within the engine once during each firing cycle of the engine; and
   counter means, responsive to the indicating means, for counting the number of firings of the spark plugs in the engine, the counter means being reset each time the one pre-determined spark plug is detonated.

4. The vibration testing apparatus of claim 1 further including:
   means for setting the sequence of firing order of the spark plugs including a plurality of settable switches, each associated with one of the cylinders of the engine.

5. The vibration testing apparatus of claim 4 wherein the vibration testing apparatus includes at least eight pre-set-table switches, each corresponding to one cylinder of the engine.

6. The vibration testing apparatus of claim 1 further including:
   means, responsive to the speed of rotation of the engine, for varying the frequencies set for each cylinder for different speeds of the engine.

7. The vibration testing apparatus of claim 1 further including:
   first and second filter means, each settable to a different frequency range to detect first and second distinct frequencies, respectively, from the sensing means.

* * * * *